(12) United States Patent    (10) Patent No.: US 9,148,305 B1
Noujeim    (45) Date of Patent: Sep. 29, 2015

(54) CONFIGURABLE 10/40 GIGABIT ETHERNET SWITCH FOR OPERATING IN ONE OR MORE NETWORK OPERATING MODES

(75) Inventor: Leesa Marie Noujeim, Los Altos, CA (US)

(73) Assignee: Google Inc., Mountain View, CA (US)

( * ) Notice: Subject to any disclaimer, the term of this patent is extended or adjusted under 35 U.S.C. 154(b) by 145 days.

(21) Appl. No.: 13/525,867

(22) Filed: Jun. 18, 2012

(51) Int. Cl.
*H04L 12/28* (2006.01)
*H04L 12/64* (2006.01)
*H04L 12/933* (2013.01)

(52) U.S. Cl.
CPC .......... *H04L 12/6418* (2013.01); *H04L 49/101* (2013.01)

(58) Field of Classification Search
USPC .................. 370/351–356, 360–368, 373–377, 370/384–385, 389–394, 431–443, 479–482, 370/498–499
See application file for complete search history.

(56) References Cited

U.S. PATENT DOCUMENTS

| 5,535,373 | A * | 7/1996 | Olnowich ........................ 703/25 |
| 6,243,361 | B1 * | 6/2001 | McMillen et al. ............ 370/254 |
| 6,871,294 | B2 * | 3/2005 | Phelps et al. ................. 714/5.11 |
| 2005/0259571 | A1 * | 11/2005 | Battou .......................... 310/217 |
| 2009/0268498 | A1 * | 10/2009 | Nomura et al. ................ 365/51 |
| 2012/0087661 | A1 * | 4/2012 | Look ............................. 398/65 |

* cited by examiner

*Primary Examiner* — Thai Hoang
(74) *Attorney, Agent, or Firm* — Lerner, David, Littenberg, Krumholz & Mentlik, LLP

(57) ABSTRACT

A configurable network switch is disclosed. The configurable network switch may include a plurality of network switch chips operatively connected to a plurality of connectors via a programmable crosspoint chip. The programmable crosspoint chip may be configured to operate in one or more network operating modes. In a first network operating mode, the programmable crosspoint chip may be configured to operate at 40 Gigabit Ethernet speeds, whereas in the second network operating mode, the programmable crosspoint chip may be configured to operate at 10 Gigabit Ethernet speeds. The configurable network switch may also include an input interface, such as an I²C interface, that allows an operator of the network switch to select the one or more network operating modes of the configurable network switch.

18 Claims, 7 Drawing Sheets

CONFIGURABLE 10/40 GIGABIT ETHERNET SWITCH FOR OPERATING IN ONE OR MORE NETWORK OPERATING MODES

BACKGROUND

A network switch may be a mechanical, electrical, or electronic device that opens or closes circuits, completes or breaks an electrical path, or selects paths of circuits. A switch may operate at Layers 1 and 2 of the Open Systems Interconnection ("OSI") model, with an emphasis on Layer 2. A switch may examine incoming data (such as voice data, computer data, or other type of data) to determine a destination address. Based on that address, the switch may establish a transmission path through a switching matrix between incoming and outgoing physical communications ports and links.

A network switch may include a "switching fabric." The term "switching fabric" refers to the component at the heart of a data communications switch that allows any input port to send data to any output port. Although there are many different types of switching fabrics available, one of the more common switching fabrics is a "crossbar" switching fabric. A crossbar switching fabric may include a matrix of rows and columns, where each row is connected to an input and each column is connected to an output port. A switch, or "crosspoint," may be located at each intersection between a row and column. By closing the crosspoints, each input port can be connected to each output port.

However, there are limitations to the use of switching fabrics. One such limitation is speed. Depending on the composition of the switching fabric and the connections within, the switching fabric may limit the speed at which data travels through the network switch. Another limitation is cost. Depending on the number of input ports and output ports, the cost to build a compatible or desirable switching fabric may increase substantially to accommodate the possible number of connections.

As networking speeds have increased, the desire for high-speed network switches have also increased. As mentioned above, a network switch that relies on a switching fabric may impact the speed at which a network operates. Thus, a network switch may be configured where the input ports are directly directed to output ports. That is, the network switch may forego a switching fabric and instead, embed data connections between input and output ports within a printed circuit board housed within the network switch. While this solution may achieve desirable data rates, the network switch is no longer configurable. Thus, a high-speed network switch, where the data connections are embedded within the printed circuit board, is difficult to use in an environment that requires the high-speed network switch to be configurable.

SUMMARY

To address these and other problems, this disclosure provides for an apparatus having selectable operating network modes. In one embodiment, the apparatus may include a memory operative to store a first operating network mode configuration and a second operating network mode configuration. The apparatus may also include a programmable crosspoint chip operable in one of the first operating network mode configuration or the second operating network mode configuration.

Furthermore, the apparatus may include a processor in communication with the memory and operative to receive a selection of one of the first operating network mode configuration or the second operating network mode configuration from an input interface, and retrieve one of the first operating network mode configuration or the second operating network mode configuration based on the received selection. The processor may be further operative to configure the programmable crosspoint chip to operate in the first operating network mode configuration or the second operating network mode configuration based on the received selection.

In another embodiment of the apparatus, the selection of the first operating network mode configuration or the second operating mode configuration may be a manual selection.

In a further embodiment of the apparatus, the apparatus may include a plurality of input data channels, wherein each input data channel may be operatively connected to an input of the programmable crosspoint chip. The apparatus may also include a plurality of output data channels, wherein each output data channel may be operatively connected to an output of the programmable crosspoint chip.

In yet another embodiment of the apparatus, the plurality of input data channels may include four input data channels, wherein a first input data channel may be operatively connected to a first input device, a second input data channel may be operatively connected to a second input device, a third input data channel may be operatively connected to a third input device, and a fourth input data channel may be operatively connected to a fourth input device. In addition, the plurality of output data channels may include a first output data channel, a second output data channel, a third output data channel, and a fourth output data channel, where each output data channel may be operatively connected to an output device.

Furthermore, the first operating network mode configuration may be operative to connect the first input data channel with the first output data channel, connect the second input data channel with the second output data channel, connect the third input data channel with the third output data channel, and connect the fourth input data channel with the fourth output data channel.

In yet a further embodiment of the apparatus, the plurality of input data channels may include a first input data channel, a second input data channel, a third input data channel, and a fourth input data channel, where each input data channel may be operatively connected to an input device. In addition, the plurality of output data channels may include a first output data channel, a second output data channel, a third output data channel, and a fourth output data channel, where each output data channel may be operatively connected to an output device. Furthermore, the second operating network mode configuration may be operative to connect the first input data channel with the first output data channel, connect the second input data channel with the second output data channel, connect the third input data channel with the third output data channel, and connect the fourth input data channel with the fourth output data channel.

In another embodiment of the apparatus, the first operating network mode configuration may be operative to connect a plurality of input data channels operatively connected to the programmable crosspoint chip with a plurality of output data channels operatively connected to the programmable crosspoint chip. In addition, the second operating network mode configuration may be operative to connect the plurality of input data channels with the plurality of output data channels. Furthermore, at least one connection between an input data channel and an output data channel may be different when the programmable crosspoint chip operates in the first operating network mode configuration than when the programmable crosspoint chip operates in the second operating network mode configuration.

This disclosure also provides for an apparatus having selectable operating network modes, where the apparatus includes a memory operative to store a first operating network mode configuration and a second operating network mode configuration, and a programmable crosspoint chip operable in one of the first operating network mode configuration or the second operating network mode configuration. The apparatus may also include a first input data channel operatively connected to a first output data channel, wherein the connection between the first input data channel and the first output data channel may be unaffected by either the first operating network mode configuration or the second operating network mode configuration. The apparatus may also include a processor in communication with the memory, where the processor is operative to receive a selection of one of the first operating network mode configuration or the second operating network mode configuration from an input interface and retrieve one of the first operating network mode configuration or the second operating network mode configuration based on the received selection. The processor may also be operative to configure the programmable crosspoint chip to operate in the first operating network mode configuration or the second operating network mode configuration based on the received selection.

In another embodiment of the apparatus, the apparatus may include a second input data channel, a third input data channel, and a fourth input data channel, where each of the second, third, and fourth input data channels may be operatively connecting the programmable crosspoint chip with an input device. The apparatus may also include a second output data channel that may be operatively connecting the programmable crosspoint chip with a first output device. The apparatus may further include a third output data channel that may be operatively connecting the programmable crosspoint chip with a second output device. In addition, the apparatus may include a fourth output data channel that may be operatively connecting the programmable crosspoint chip with a third output device. In this embodiment, the first operating network mode configuration may be operative to connect the second input data channel with the second output data channel, connect the third input data channel with the third output data channel, and connect the fourth input data channel with the fourth output data channel.

In yet another embodiment of the apparatus, the apparatus may include a second input data channel, a third input data channel, and a fourth input data channel, where each of the second, third, and fourth input data channels may operatively connect the programmable crosspoint chip with an input device. The apparatus may also include a second output data channel, a third output data channel, and a fourth output data channel, where each of the second, third, and fourth output data channels may operatively connect the programmable crosspoint chip with an output device. Furthermore, the second operating network mode configuration may be operative to connect the second input data channel with the second output data channel, connect the third input data channel with the third output data channel, and connect the fourth input data channel with the fourth output data channel.

In a further embodiment of the apparatus, the first input data channel and the second output data channel may share an electrical pathway, and the electrical pathway may bypass the programmable crosspoint chip.

In yet another embodiment of the apparatus, the selection of one of the first operating network mode configuration or the second operating network mode configuration may be a manual selection.

This disclosure provides for a further apparatus having selectable operating network modes, where the apparatus may include a memory operative to store a first operating network mode configuration and a second operating network mode configuration, and a programmable crosspoint chip operable in one of the first operating network mode configuration or the second operating network mode configuration. The apparatus may also include a plurality of input data channels that may include a first input data channel, a second input data channel, a third input data channel, and a fourth input data channel, where each input data channel may operatively connect the programmable crosspoint chip with an input device.

The apparatus may also include a plurality of output data channels that include a first output data channel, a second output data channel, a third output data channel, and a fourth output data channel, where each output data channel may operatively connect the programmable crosspoint chip with a first output device. In addition, a fifth output data channel may operatively connect the programmable crosspoint chip with a second output device, a sixth output data channel may operatively connect the programmable crosspoint chip with a third output device, and a seventh output data channel may operatively connect the programmable crosspoint chip with a fourth output device.

The apparatus may further include a processor in communication with the memory and operative to receive a selection of one of the first operating network mode configuration or the second operating network mode configuration. The processor may be further operative to configure the programmable crosspoint chip to operate in the first operating network mode configuration or the second operating network mode configuration based on the received selection. The first operating network mode configuration may operatively connect the first input data channel with the first output data channel, the second input data channel with the second output data channel, the third input data channel with the third output data channel, and the fourth input data channel with the fourth output data channel. The second operating network mode configuration may operatively connect the first input data channel with the first output data channel, the second input data channel with the fifth output data channel, the third input data channel with the sixth output data channel, and the fourth input data channel with the seventh output data channel.

A method for selecting an operating mode of a programmable crosspoint switch is also disclosed. The method may include storing, in a computer-readable memory, a first operating network mode configuration and a second operating network mode configuration, and receiving, with an input interface, a selection of one of the first operating network mode configuration or the second operating network mode configuration from an input interface. The method may also include retrieving, with a processor in communication with the input interface, one of the first operating network mode configuration or the second operating network mode configuration based on the received selection, and instructing, with the processor, a programmable crosspoint chip to operate in the first operating network mode configuration or the second operating network mode configuration based on the received selection.

In another embodiment of the method, receiving a selection of the first operating network mode configuration or the second operating mode configuration may include receiving the selection from a user of the programmable crosspoint chip.

In a further embodiment of the method, the method may include operatively connecting a plurality of input data channels to the programmable crosspoint chip, wherein each input data channel may be operatively connected to an input of the programmable crosspoint chip, and operatively connecting a plurality of output data channels to the programmable crosspoint chip, wherein each output data channel may be operatively connected to an output of the programmable crosspoint chip.

In yet another embodiment of the method, the plurality of input data channels may include four input data channels, wherein a first input data channel may be operatively connected to a first input device, a second input data channel may be operatively connected to a second input device, a third input data channel may be operatively connected to a third input device, and a fourth input data channel may be operatively connected to a fourth input device. In addition, the plurality of output data channels may include a first output data channel, a second output data channel, a third output data channel, and a fourth output data channel, where each output data channel may be operatively connected to an output device. Moreover, the method may further include, when the first operating network mode configuration is selected, connecting the first input data channel with the first output data channel, connecting the second input data channel with the second output data channel, connecting the third input data channel with the third output data channel, and connecting the fourth input data channel with the fourth output data channel.

In yet a further embodiment of the method, the plurality of input data channels may include a first input data channel, a second input data channel, a third input data channel, and a fourth input data channel, where each input data channel may be operatively connected to an input device. In addition, the plurality of output data channels may include a first output data channel, a second output data channel, a third output data channel, and a fourth output data channel, where each output data channel may be operatively connected to an output device. Furthermore, the method may also include, when the second operating network mode configuration is selected, connecting the first input data channel with the first output data channel, connecting the second input data channel with the second output data channel, connecting the third input data channel with the third output data channel, and connecting the fourth input data channel with the fourth output data channel.

In another embodiment of the method, the method may further include, when the first operating network mode configuration is selected, connecting a plurality of input data channels operatively connected to the programmable crosspoint chip with a plurality of output data channels operatively connected to the programmable crosspoint chip, and, when the second operating network mode configuration is selected, connecting the plurality of input data channels with the plurality of output data channels. In addition, at least one connection between an input data channel and an output data channel may be different when the programmable crosspoint chip operates in the first operating network mode configuration than when the programmable crosspoint chip operates in the second operating network mode configuration.

This disclosure provides for a further method for selecting operating network modes of a programmable crosspoint switch. In one embodiment, the method may include storing, in a computer-readable memory of a programmable crosspoint switch, a first operating network mode configuration and a second operating network mode configuration, and receiving, with an input interface of the programmable crosspoint switch, a selection of one of the first operating network mode configuration or the second operating network mode configuration. The method may also include retrieving, with a processor of the programmable crosspoint switch, one of the first operating network mode configuration or the second operating network mode configuration based on the received selection, and instructing, with the processor in communication with a programmable crosspoint chip, the programmable crosspoint chip to operate in the first operating network mode configuration or the second operating network mode configuration based on the received selection. Moreover, a connection between a first input data channel of the programmable crosspoint switch and a first output data channel of the programmable crosspoint switch may be unaffected by either the first operating network mode configuration or the second operating network mode configuration.

In another embodiment of the method, the method may include operatively connecting a second input data channel, a third input data channel, and a fourth input data channel, of the programmable crosspoint switch with an input device, and operatively connecting a second output data channel of the programmable crosspoint switch with a first output device. The method may also include operatively connecting a third output data channel of the programmable crosspoint switch with a second output device, and operatively connecting a fourth output data channel of the programmable crosspoint chip with a third output device. Furthermore, when the first operating network mode is selected, the method may include connecting the second input data channel with the second output data channel, connecting the third input data channel with the third output data channel, and connecting the fourth input data channel with the fourth output data channel.

In a further embodiment of the method, the method may include operatively connecting a second input data channel, a third input data channel, and a fourth input data channel of the programmable crosspoint switch with an input device, and operatively connecting a second output data channel, a third output data channel, and a fourth output data channel of the programmable crosspoint chip with an output device. The method may also include, when the second operating network mode configuration is selected, connecting the second input data channel with the second output data channel, connecting the third input data channel with the third output data channel, and connecting the fourth input data channel with the fourth output data channel.

In yet another embodiment of the method, the first input data channel and the second output data channel may share an electrical pathway, and the electrical pathway may bypass the programmable crosspoint chip.

In yet a further embodiment of the method, receiving the selection of one of the first operating network mode configuration or the second operating network mode configuration may include receiving a user selection of the first operating network mode configuration or the second operating network mode configuration.

This disclosure provides for yet a further method for selecting an operating network mode of a programmable crosspoint switch. In one embodiment, the method may include storing, in a computer-readable memory, a first operating network mode configuration and a second operating network mode configuration, operatively connecting a first input data channel, a second input data channel, a third input data channel, and a fourth input data channel of the programmable crosspoint chip with an input device, and operatively connecting a first output data channel, a second output data channel, a third output data channel, and a fourth output data channel of the programmable crosspoint chip with a first output device. The method may also include operatively connecting a fifth output data channel of the programmable crosspoint chip with a second output device and operatively connecting a sixth output data channel of the programmable crosspoint chip with a third output device. The method may further include operatively connecting a seventh output data channel of the programmable crosspoint chip with a fourth output device. Moreover, the method may include receiving a selection of one of the first operating network mode configuration or the second operating network mode configuration, and instructing the programmable crosspoint chip to operate in the first operating network mode configuration or the second operating network mode configuration based on the received selection.

In addition, the method may provide that the first operating network mode configuration operatively connects the first input data channel with the first output data channel, the second input data channel with the second output data channel, the third input data channel with the third output data channel, and the fourth input data channel with the fourth output data channel. The method may also provide that the second operating network mode configuration operatively connects the first input data channel with the first output data channel, the second input data channel with the fifth output data channel, the third input data channel with the sixth output data channel, and the fourth input data channel with the seventh output data channel.

DETAILED DESCRIPTION

Figure 1:
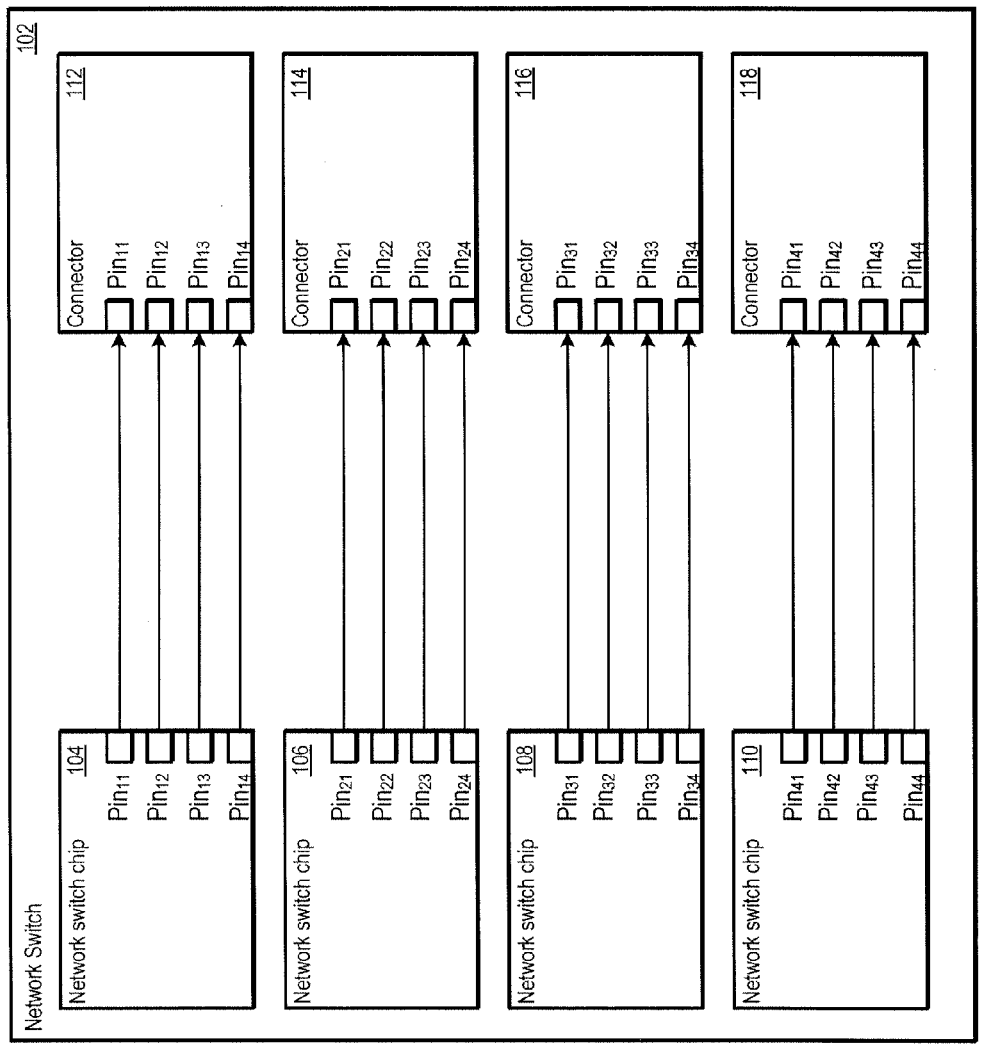
FIG. 1 illustrates one example of a network switch according to the prior art.

The present disclosure relates to a configurable network switch and, in particular, a configurable network switch configured to operate in more than one network operating mode. In one example, the configurable network switch may be configured to operate in one or more network operating modes, such as a 40 Gigabit Ethernet ("40 GbE") operating mode and a 10 GbE network operating mode. In the 40 GbE operating mode, the network switch may be configured to transmit data or information between a first device and a second device using four data channels as a single communication link. In the 10 GbE operating mode, the network switch may be configured to transmit data or information between a first device and multiple devices, such that each data channel with each of the multiple devices is treated as a single communication link. Alternatively, in the 10 GbE operating mode, a first device may communicate with a second device using four separate data/information channels, where each data channel is also treated as a single communication link. As an initial matter, FIG. 1 illustrates one example of a network switch 102 according to the prior art. The network switch 102 is configured to operate in a 40 GbE networking operating mode. The network switch 102 includes four network switch chips 104-110 and four connectors 112-118. Each network switch chip 104-110 may support up to four input devices. Each connector 112-118 may support up to four output devices. In this manner, four networked devices of a network switch chip 104 may be in communication with four devices connected to a connector 112.

The data connection for each device is represented by a data connection between the network switch chip 104-110 and a corresponding connector 112-118. Thus, $Pin_{11}$ of the network switch chip 104 represents the data connection for a first networked device connected network switch chip 104, and $Pin_{11}$ represents the data connection for a networked device connected to the connector 112. Each "Pin" designation may not literally be single pin connection, but may be a collection of pins or other electrical lines connecting a given network switch chip with a connector. The "Pin" designation is a logical designation and the physical connection between a network switch chip and connector may vary depending on the capabilities and materials used in the construction of the network switch 102.

As shown in FIG. 1, the network switch 102 operates at 40 GbE speeds. The network switch 102 transmits at 40 GbE speeds since each network switch chip 104-110 is connected to single connector 112-118 (i.e., network switch chip 104 is connected to connector 112, network switch chip 106 is connected to connector 114, network switch chip 108 is connected to connector 116 and network switch chip 110 is connected to connector 118). Each of the data connections (e.g., data connection between $Pin_{11}$ of the network switch chip 104 and $Pin_{11}$ of the connector 112) may be physically embedded in a printed circuit board (not shown) of the network switch 102. Thus, while the network switch 102 may transmit at 40 GbE speeds, the network switch 102 is limited to the configuration shown in FIG. 1.

Figure 2:
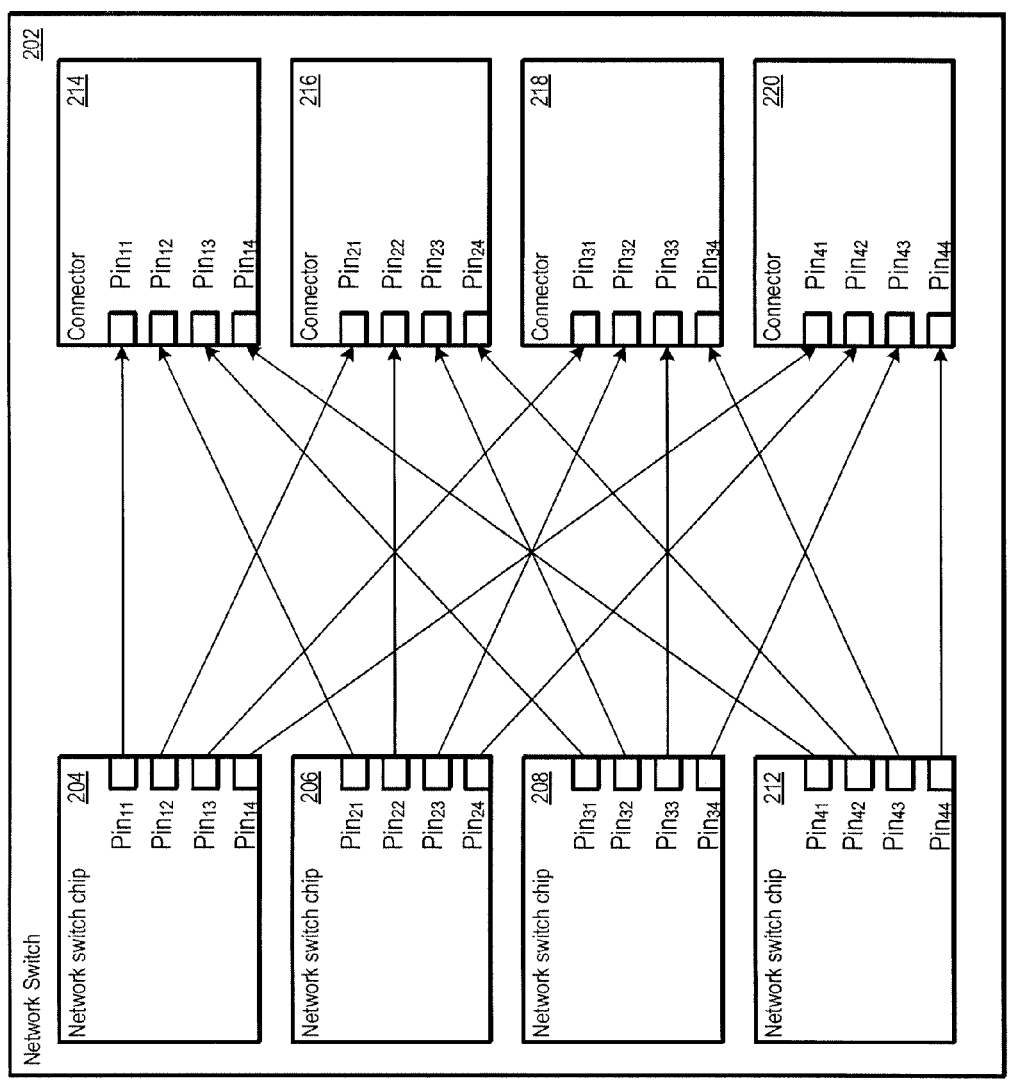
FIG. 2 illustrates another example of a network switch according to the prior art.

FIG. 2 illustrates an alternative network switch 202. As with the network switch 102, the network switch 202 includes four network switch chips 204-212 and four connectors 214-220. However, each network switch chip 204-212 may be connected to each connector 214-220. For example, each pin of network switch chip 204 may be connected to a corresponding pin of each connector 214-220. More specifically, $Pin_{11}$ of network switch chip 204 may be connected to $Pin_{11}$ of connector 214, $Pin_{12}$ of network switch chip 204 may be connected to $Pin_{21}$ of connector 216, $Pin_{13}$ of network switch chip 204 may be connected to $Pin_{31}$ of connector 218, and $Pin_{14}$ of network switch chip 204 may be connected to $Pin_{41}$ of connector 220. Similar connections may exist for each of network switch chips 206-212.

The network switch 202 may operate at 10 GbE speeds. That is, each of the devices connected to $Pin_{11}$-$Pin_{14}$ of network switch chip 204 may transmit at 10 GbE speeds to the devices connected to $Pin_{11-41}$ of connectors 214-220. The network switch 202 may operate at 10 GbE speeds since a single network switch chip may communicate with four distinct connectors. Moreover, like the network switch 102, the data connections between the network switch chips 204-212 and the connectors 214-220 may also be embedded in a printed circuit board. Thus, the network switch 202 is unconfigurable should the operator of the network switch 202 want to change its internal configuration to support increased transmission speeds.

Figure 3:
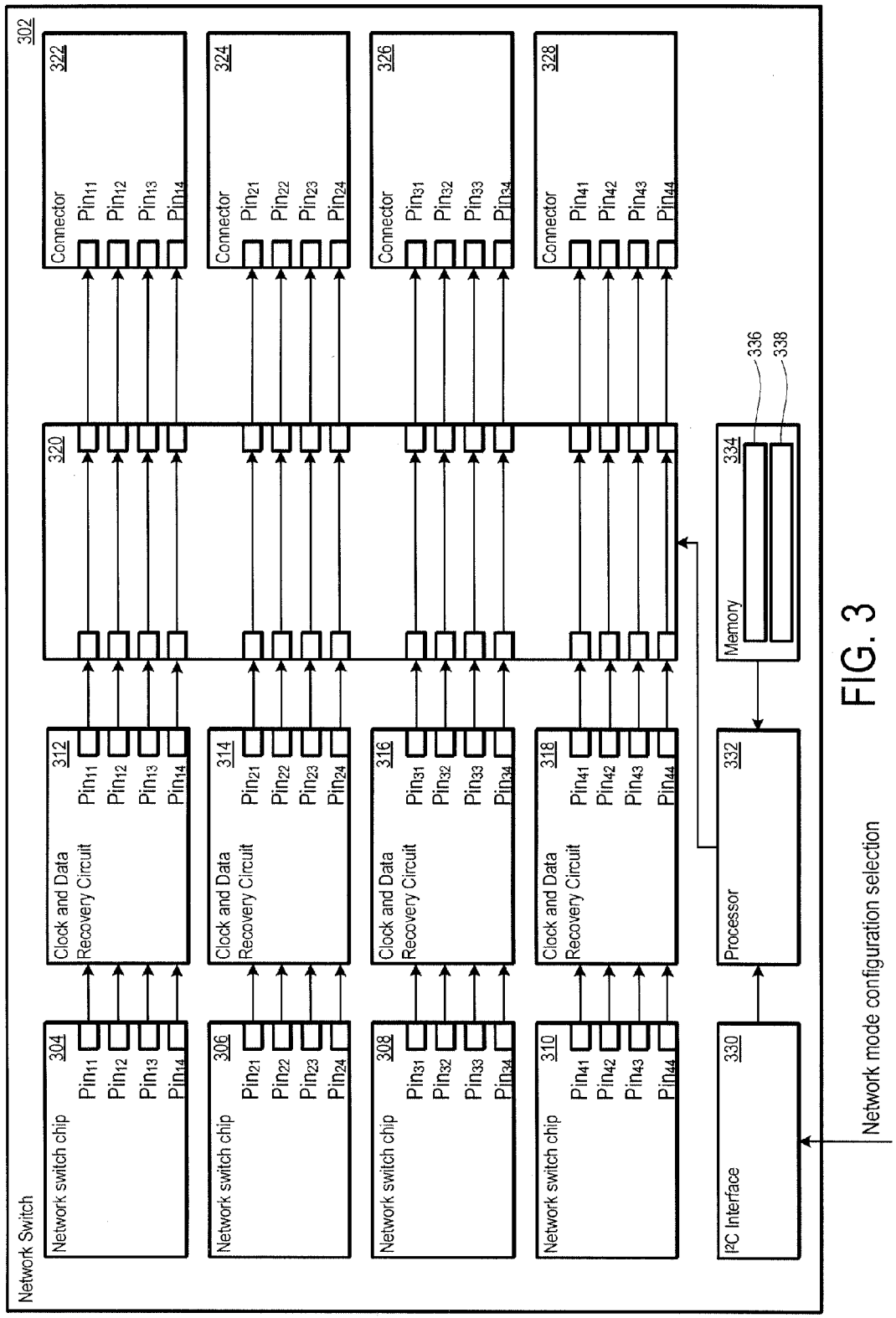
FIG. 3 illustrates one example of a configurable network switch operating in a first network operating mode according to aspects of the disclosure.

To address these and other problems in network switching, the present disclosure provides for a network switch 302 as shown in FIG. 3. In one example, the network switch 302 may include network switch chips 304-310, one or more clock and data recovery circuits 312-318, a programmable crosspoint chip 320, one or more connectors 322-328, an input interface 330, a processor 332, and a memory 334. The network switch 302 may be configurable to operate in one of two network operating modes, a first network operating mode transmitting at 40 GbE speeds and a second network operating mode transmitting at 10 GbE speeds. Moreover, each input data connection of the network switch 302 (e.g., $Pin_{11}$-$Pin_{14}$ of network switch chip 304, $Pin_{21}$-$Pin_{24}$ of network switch chip 306, etc.) and each output data connection of the network switch 302 (e.g., $Pin_{11}$-$Pin_{14}$ of connector 322, $Pin_{21}$-$Pin_{22}$ of connector 324, etc.) may be configured to transmit data at either the 10 GbE speed or the 40 GbE speed. Unlike the network switch 102 or the network switch 202, an operator may configure the input ports on the network switch 302 to operate at these speeds.

The network switch chips 304-310 may be any type of network switch chips. The network switch chips 304-310 may be physically housed in the network switch 302, physically connected to the network switch 302, or may be logically connected to the network switch 302 with one or more intervening devices or networks therebetween. Combinations of the foregoing are also possible.

Each network switch chip 304-310 may have one or more data connections, designated as $Pin_{ij}$, where i corresponds to the network switch chip and j corresponds to the data connection. Thus, $Pin_{11}$ corresponds to the first data connection on the first network switch chip 304 and $Pin_{44}$ corresponds to the fourth data connection on the fourth network switch chip 310. Each data connection may be a single pin or a collection of pins connecting a network switch chip with a corresponding connector. Moreover, a data connection may be another type of electrical connection, such as a wire, connecting the network switch chip with a connector. Combinations of different types of electrical connections between a network switch chip and a connector are also possible. Although not shown, each network switch chip 304 may have one or more input ports, where each input port corresponds to a given data connection, connecting an input device, such as a computer, server, router, or other device, with the network switch 302.

Accordingly, each connector 322-326 may have a data connection designated as $Pin_{ij}$, where i designates the connector and j designates the data connection. For example, $Pin_{11}$ identifies the first data connection on connector 322 and $Pin_{44}$ identifies the fourth data connection on connector 328. Although not shown, each connector 328 may have an output port, where each output port corresponds to a data connection, connecting a device, such as a computer, server, router, or other device, with the network switch 302. Thus, in FIG. 3, a first input device transmitting on $Pin_{11}$ on network switch chip 304 would share a data connection (i.e., networked) with a first output device receiving from $Pin_{11}$ on connector 322. Similarly, a second input device transmitting on $Pin_{12}$ of network switch chip 304 would be networked with a second output device receiving from $Pin_{12}$ of connector 322. The first input device transmitting on $Pin_{11}$ of the network switch chip 304 and the second input device connected to $Pin_{12}$ of the network switch chip 304 may or may not be the same device. Similarly, the first output device connected to $Pin_{11}$ of the connector 322 and the second output device connected to $Pin_{12}$ of the connector 322 may or may not be the same output device.

Although the network switch chips 304-310 are described as being connected to input devices, the network switch 302 may be bi-directional. With bi-directional communication, an input device connected to a network switch chip may also be an output device, and an output device connected to a connector may also be an input device. Thus, the configuration of the network switch 302 shown in FIG. 3 may obtain 40 GbE speeds regardless of whether communication starts with an input device (output device) connected to a network switch chip or with an output device (input device) connected to a connector.

Clock and data recovery circuits 312-318 may be interposed (logically and/or physically) between network switch chips 304-310 and the programmable crosspoint chip 320. The clock and data recovery circuits 312-318 are operative to perform clock and data recovery on one or more of the data connections for a corresponding network switch chip and/or corresponding connector. Moreover, clock and data recovery circuits 312-318 may be optional, or a single clock and data recovery circuit may be operative to perform clock and data recovery for each of network switch chips 304-310, for each of the connectors 322-328, or combinations of the foregoing.

The clock and data recovery circuits 312-318 continue the data connections of the network switch chips 304-310 with the programmable crosspoint chip 320. The programmable crosspoint chip 320 is operative to connect any one of the data connections from a given network switch chip with any one of the data connections with a given connector.

The programmable crosspoint chip 320 may be in communication with a processor 332, which may communicate an operating network mode configuration to the programmable crosspoint chip. The operating network mode configuration may instruct the programmable crosspoint chip 320 which data connections to form between the network switch chips 304-310 and the connectors 322-328. The processor 332 may retrieve an operating network mode configuration from the memory 334. Accordingly, the memory 334 may store one or more operating network mode configurations 336-338. In one embodiment, the operating network mode configurations include a first operating network mode configuration 336, where the network switch 302 operates at an increased transfer speed (e.g. in a 40 GbE mode and shown in FIG. 3), and a second operating network mode configuration 338, where the network switch 302 operates at a decreased transfer speed (e.g., in a 10 GbE mode; shown in FIG. 4 and discussed in more detail below).

The processor 332 may be any conventional processor or microprocessor, such as processors from Intel Corporation or Advanced Micro Devices. Alternatively, the processor may be a dedicated device such as an application-specific integrated circuit ("ASIC"). Although FIG. 4 functionally illustrates the processor 332, the memory 334, and other elements of the network switch 302 as being within the same block, it will be understood by those of ordinary skill in the art that the processor 332 and the memory 334 may actually comprise multiple processors and memories that may or may not be stored within the same physical housing. For example, the memory 334 may be a hard drive or other storage media located in a housing different from that of the network switch 302. Accordingly, references to a processor, memory, the network switch 302, or a computer will be understood to include references to a collection of processors or computers or memories that may or may not operate in parallel. Rather than using a single processor to perform the steps described herein, some of the components may each have their own processor that perform operations related to the component's specific function.

The memory 334 may be of any type of memory operative to store information accessible by the processor 332, including a computer-readable medium, or other medium that stores data that may be read with the aid of an electronic device, such as a hard-drive, memory card, read-only memory ("ROM"), random-access memory ("RAM"), an electrically erasable programmable read-only memory ("EEPROM"), one or more a digital video disc ("DVD") or other optical disks, as well as other write-capable and read-only memories. Systems and methods may include different combinations of the foregoing, whereby different portions of the software functionalities of the network switch 302 are stored on different types of media.

The memory 334 may include any set of computer-executable instructions to be executed directly (such as machine code) or indirectly (such as scripts) by the processor 332. For example, the computer-executable instructions may be stored as computer code on a computer-readable medium. In that regard, the terms "instructions," "programs," and "applications" may be used interchangeably herein. The instructions may be stored in object code format for direct processing by the processor 332, or in any other computer language including scripts or collections of independent source code modules that are interpreted on demand or compiled in advance. Functions, methods and routines of these instructions are explained in more detail below.

The operating network mode configurations 336-338 may be retrieved, stored or modified by processor 332. For instance, although systems and methods disclosed herein are not limited by any particular data structure, the operating network mode configurations 336-338 may be stored in computer registers, as a relational database defined by a table having a plurality of different fields and records, Extensible Markup Language ("XML") documents or flat files. The operating network mode configurations 336-338 may also be formatted in any computer-readable format. The operating network mode configurations 336-338 may comprise any information sufficient to identify the relevant information, such as numbers, descriptive text, proprietary codes, references to data stored in other areas of the same memory or different memories (including other network locations) or information that is used by a function to calculate the relevant data.

In various examples described herein, the processor 332 may be located remote from the network switch 102 and may communicate with one or more components, such as the memory 334, wirelessly over a network (e.g., a local area network, a wide area network, etc.). In addition, one or more of the components may be housed within other servers or computers, and the network switch 302 may receive information from those components. For example, the operating network mode configurations 336-338 may be stored in another server or computer and the processor 332 may receive information from each of these other servers and/or computers. In other aspects, some of the processes described herein are executed on a processor disposed within the network switch 302 and others by a remote processor housed within a server being monitored, including performing operations for configuring the network switch 302 to operate in a 10 GbE mode or a 40 GbE mode.

As discussed previously, the operating network mode configurations 336-338 may instruct the programmable crosspoint chip 320 which data connections to establish between the network switch chips 304-310 and the connectors 322-328. Table 1 shows the data connections that may be established when the processor 332 loads the first operating network mode configuration 336 in the programmable crosspoint chip 320.

TABLE 1

Data Connections for First Network Operating Mode Configuration (FIG. 3)

| Network Switch chip ("NSC") | Data Connection | | Connector | Data connection |
|---|---|---|---|---|
| NSC 304 | $Pin_{11}$ | connected to | Connector 322 | $Pin_{11}$ |
| NSC 304 | $Pin_{12}$ | connected to | Connector 322 | $Pin_{12}$ |
| NSC 304 | $Pin_{13}$ | connected to | Connector 322 | $Pin_{13}$ |
| NSC 304 | $Pin_{14}$ | connected to | Connector 322 | $Pin_{14}$ |
| NSC 306 | $Pin_{21}$ | connected to | Connector 324 | $Pin_{21}$ |
| NSC 306 | $Pin_{22}$ | connected to | Connector 324 | $Pin_{22}$ |
| NSC 306 | $Pin_{23}$ | connected to | Connector 324 | $Pin_{23}$ |
| NSC 306 | $Pin_{24}$ | connected to | Connector 324 | $Pin_{24}$ |
| NSC 308 | $Pin_{31}$ | connected to | Connector 326 | $Pin_{31}$ |
| NSC 308 | $Pin_{32}$ | connected to | Connector 326 | $Pin_{32}$ |
| NSC 308 | $Pin_{33}$ | connected to | Connector 326 | $Pin_{33}$ |
| NSC 308 | $Pin_{34}$ | connected to | Connector 326 | $Pin_{34}$ |
| NSC 310 | $Pin_{41}$ | connected to | Connector 328 | $Pin_{41}$ |
| NSC 310 | $Pin_{42}$ | connected to | Connector 328 | $Pin_{42}$ |
| NSC 310 | $Pin_{43}$ | connected to | Connector 328 | $Pin_{43}$ |
| NSC 310 | $Pin_{44}$ | connected to | Connector 328 | $Pin_{44}$ |

Determining which network operating mode configuration to load into the programmable crosspoint chip 320 may be performed automatically, manually, or a combination thereof. In an automatic mode, the processor 332 may select which of the network operating mode configurations 336-338 to load into the programmable crosspoint chip 320 based on the input device and/or output device connected to one or more the network switch chips 304-310 and/or one or more of the connectors 322-328. For manual selection of the network operating mode configuration, the network switch 302 may include an input interface 330 in communication with the processor 332. The input interface 330 may be any type of input interface operable to receive input, such as a serial interface, a Universal Serial Bus interface ("USB"), a wireless interface, or any other such input interface.

In one example, the input interface 330 is an $I^2C$ interface in communication with the processor 332 via an $I^2C$ bus. Using the $I^2C$ interface 220, an operator of the network switch 302 may select which of the network operating mode configurations are loaded into the programmable crosspoint chip 320. Depending on which network operating mode configuration is selected by the operator, the network switch 302 may operate in a 40 GbE network operating mode or a 10 GbE network operating mode.

Figure 4:
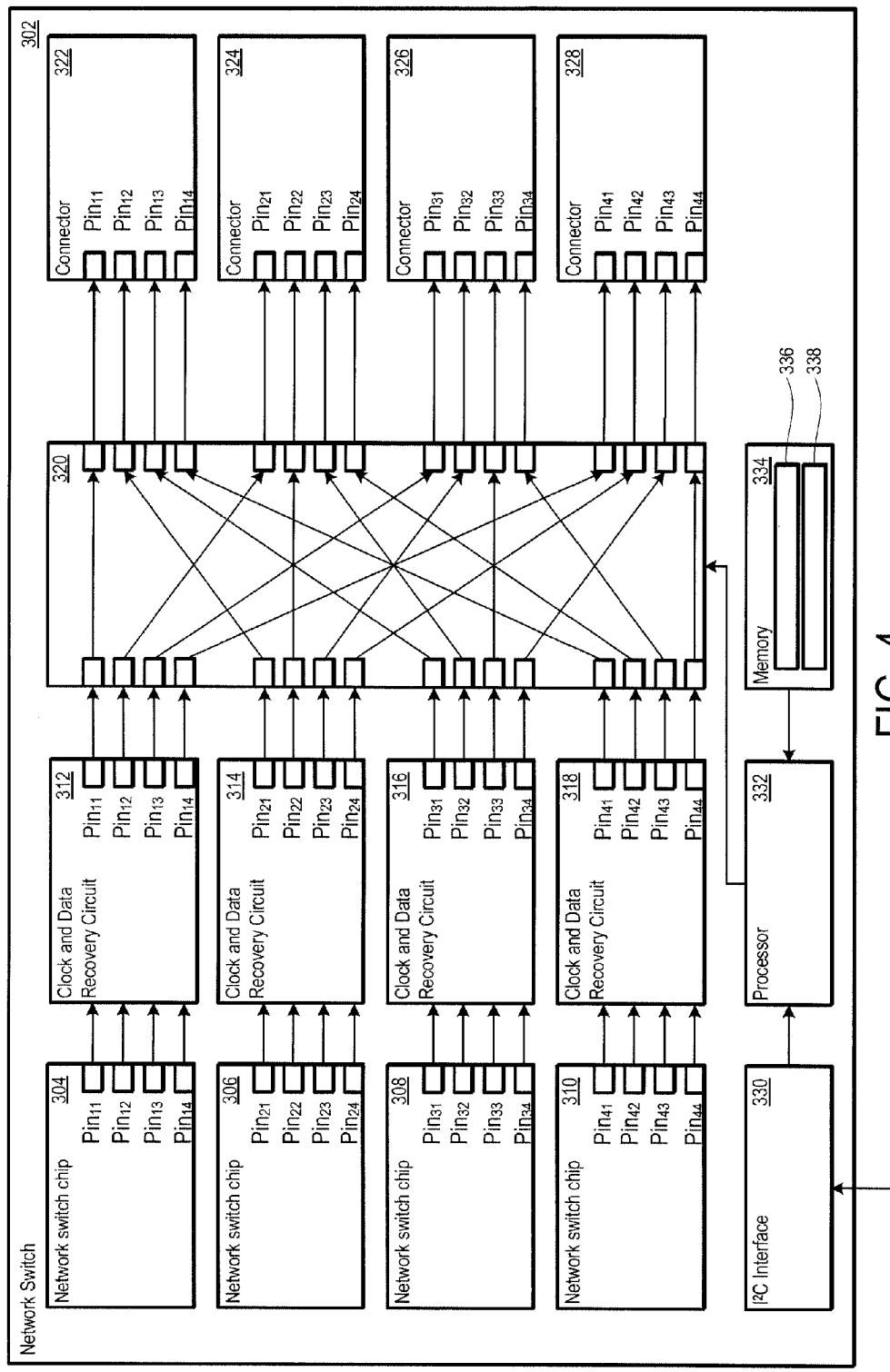
FIG. 4 illustrates the configurable network switch of FIG. 3 operating in a second network operating mode according to aspects of the disclosure.

FIG. 4 illustrates the configurable network switch 302 of FIG. 3 operating in a second network operating mode according to aspects of the disclosure. In the second network operating mode, each network switch chip 304-310 establishes a data connection with each of the connectors 322-328. In this second network operating mode, the processor 332 has loaded the second network operating mode configuration 338 into the programmable crosspoint chip 320.

Table 2 below shows the data connections that may be defined by the second network operating mode configuration and loaded into the programmable crosspoint chip 320. As discussed previously, the loading of the second network operating mode configuration 338 into the programmable crosspoint chip 320 may be performed automatically, manually, or a combination thereof (e.g., such as by automatically selecting the second network operating mode configuration and then obtaining operator confirmation to load said second network operating mode configuration).

TABLE 2

Data Connections for Second Network Operating Mode Configuration (FIG. 4)

| Network Switch chip ("NSC") | Data Connection | | Connector | Data connection |
|---|---|---|---|---|
| NSC 304 | $Pin_{11}$ | connected to | Connector 322 | $Pin_{11}$ |
| NSC 304 | $Pin_{12}$ | connected to | Connector 324 | $Pin_{21}$ |
| NSC 304 | $Pin_{13}$ | connected to | Connector 326 | $Pin_{31}$ |
| NSC 304 | $Pin_{14}$ | connected to | Connector 328 | $Pin_{41}$ |
| NSC 306 | $Pin_{21}$ | connected to | Connector 322 | $Pin_{12}$ |
| NSC 306 | $Pin_{22}$ | connected to | Connector 324 | $Pin_{22}$ |
| NSC 306 | $Pin_{23}$ | connected to | Connector 326 | $Pin_{32}$ |
| NSC 306 | $Pin_{24}$ | connected to | Connector 328 | $Pin_{42}$ |
| NSC 308 | $Pin_{31}$ | connected to | Connector 322 | $Pin_{13}$ |
| NSC 308 | $Pin_{32}$ | connected to | Connector 324 | $Pin_{23}$ |
| NSC 308 | $Pin_{33}$ | connected to | Connector 326 | $Pin_{33}$ |
| NSC 308 | $Pin_{34}$ | connected to | Connector 328 | $Pin_{43}$ |
| NSC 310 | $Pin_{41}$ | connected to | Connector 322 | $Pin_{14}$ |
| NSC 310 | $Pin_{42}$ | connected to | Connector 324 | $Pin_{24}$ |
| NSC 310 | $Pin_{43}$ | connected to | Connector 326 | $Pin_{34}$ |
| NSC 310 | $Pin_{44}$ | connected to | Connector 328 | $Pin_{44}$ |

By leveraging the programmable crosspoint chip 320 and the network operating mode configurations 336-338, the network switch 302 may establish four or more data connections between a first device and a second device, or the network switch 302 may establish for or more data connections between a first device and multiple devices. Moreover, because each network switch chip may be connected to the programmable crosspoint chip 320, an operator of the network switch 302 need not move an input device from one network switch chip to another (or from one connector to another) when the operator wants to change the transfer speed or data connections. Since each network switch chip may operate in either a 40 GbE mode or a 10 GbE mode, the network switch 302 presents a low-cost and flexible solution to having to use different input ports (or connectors) or different network switches when changes in transfer speed or data connections is desired.

Figure 5:
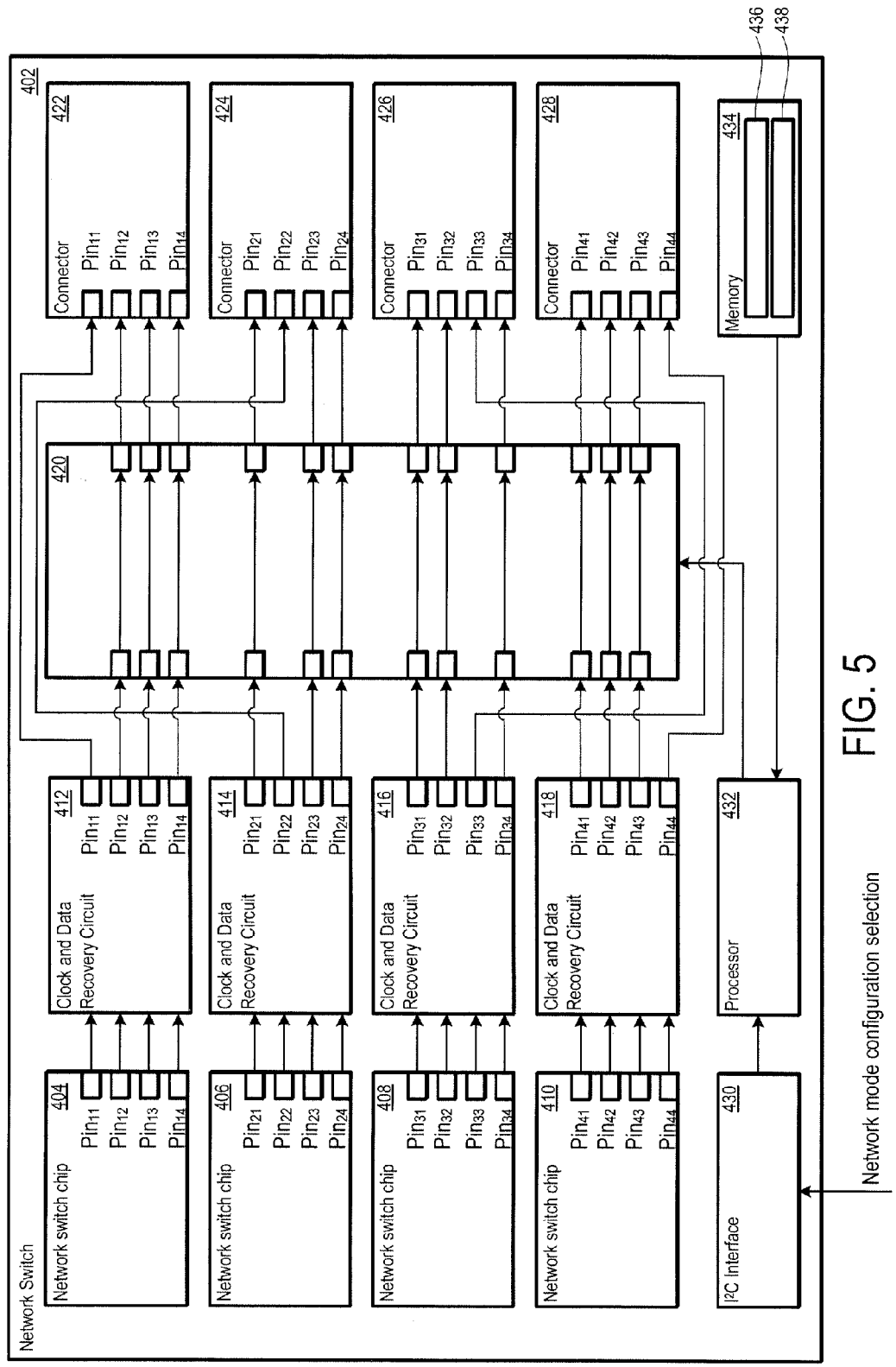
FIG. 5 illustrates another example of a configurable network switch operating in a first network operating mode according to aspects of the disclosure.

FIG. 5 illustrates another example of a configurable network switch 402 operating in a first network operating mode according to aspects of the disclosure. The configurable network switch 402 is similar to the configurable network switch 302 of FIGS. 3-4. The network switch 402 may include one or more network switch chips 404-410, one or more clock and data recovery circuits 412-418 connected with said network switch chips 404-410, a programmable crosspoint chip 420, one or more connectors 422-428, an input interface 430 for receiving a selection of a network mode configuration, a processor 432, and a memory 434. However, as shown in FIG. 5, the network switch 402 may also include one or more data connections between a network switch chip and a connector that bypass the programmable crosspoint chip 420. Certain advantages may be obtained by establishing a set of data connections that bypass the programmable crosspoint chip 420, as will be discussed below.

In the network switch 402, four data connections may bypass the programmable crosspoint chip 420: the data connection between 1) $Pin_{11}$ of the network switch chip 404 and $Pin_{11}$ of connector 422; 2) $Pin_{22}$ of network switch chip 406 and $Pin_{22}$ of connector 424; 3) $Pin_{33}$ of network switch chip 408 and $Pin_{33}$ of connector 426; and 4) $Pin_{44}$ of network switch chip 410 and $Pin_{44}$ of connector 428. These bypass data connections may be made such as by embedding the data connection within the printed circuit board of the network switch 402, by a wire connecting the network switch chip with a connector, or other such means. The network switch 402 may also include fewer or more bypass data connections, depending on the flexibility desired of the network switch 402.

The memory 434 may store one or more network operating mode configurations 436-438, such as a first network operating mode configuration 436 for configuring the programmable crosspoint chip 420 to establish multiple data connections between two devices (e.g., a 40 GbE mode), and a second network operating mode configuration 438 for configuring the programmable crosspoint chip 420 to operate at a decreased transfer speed crosspoint chip 420 to establish multiple data connections between a first device and multiple devices (e.g., a 10 GbE mode). The one or more network operating mode configurations 436-438 may be automatically selected, manually selected using the input interface 430 (e.g., an $I^2C$ interface), or a combination thereof.

Table 3 below shows the data connections of the first network operating mode configuration, which may omit the bypass data connections shown in FIG. 5.

TABLE 3

Data Connections for First Network Operating Mode Configuration (FIG. 5)

| Network Switch chip ("NSC") | Data Connection | | Connector | Data connection |
|---|---|---|---|---|
| NSC 404 | $Pin_{12}$ | connected to | Connector 422 | $Pin_{12}$ |
| NSC 404 | $Pin_{13}$ | connected to | Connector 422 | $Pin_{13}$ |
| NSC 404 | $Pin_{14}$ | connected to | Connector 422 | $Pin_{14}$ |
| NSC 406 | $Pin_{21}$ | connected to | Connector 424 | $Pin_{21}$ |
| NSC 406 | $Pin_{23}$ | connected to | Connector 424 | $Pin_{23}$ |
| NSC 406 | $Pin_{24}$ | connected to | Connector 424 | $Pin_{24}$ |
| NSC 408 | $Pin_{31}$ | connected to | Connector 426 | $Pin_{31}$ |
| NSC 408 | $Pin_{32}$ | connected to | Connector 426 | $Pin_{32}$ |
| NSC 408 | $Pin_{34}$ | connected to | Connector 426 | $Pin_{34}$ |

TABLE 3-continued

Data Connections for First Network Operating Mode Configuration (FIG. 5)

| Network Switch chip ("NSC") | Data Connection | | Connector | Data connection |
|---|---|---|---|---|
| NSC 410 | $Pin_{41}$ | connected to | Connector 428 | $Pin_{41}$ |
| NSC 410 | $Pin_{42}$ | connected to | Connector 428 | $Pin_{42}$ |
| NSC 410 | $Pin_{43}$ | connected to | Connector 428 | $Pin_{43}$ |

Bypassing the programmable crosspoint chip 420 has a number of advantages, in addition to the advantages already discussed herein. One advantage is that the memory size needed to store the network operating mode configurations is reduced. Depending on the memory sizes available, the number of entries in the network operating mode configurations may impact whether a memory of a certain size is needed. Another advantage may be that the complexity of the programmable crosspoint chip 420 may be reduced. The complexity of the programmable crosspoint chip 420 may be reduced since the programmable crosspoint chip 420 has fewer connections to establish.

Figure 6:
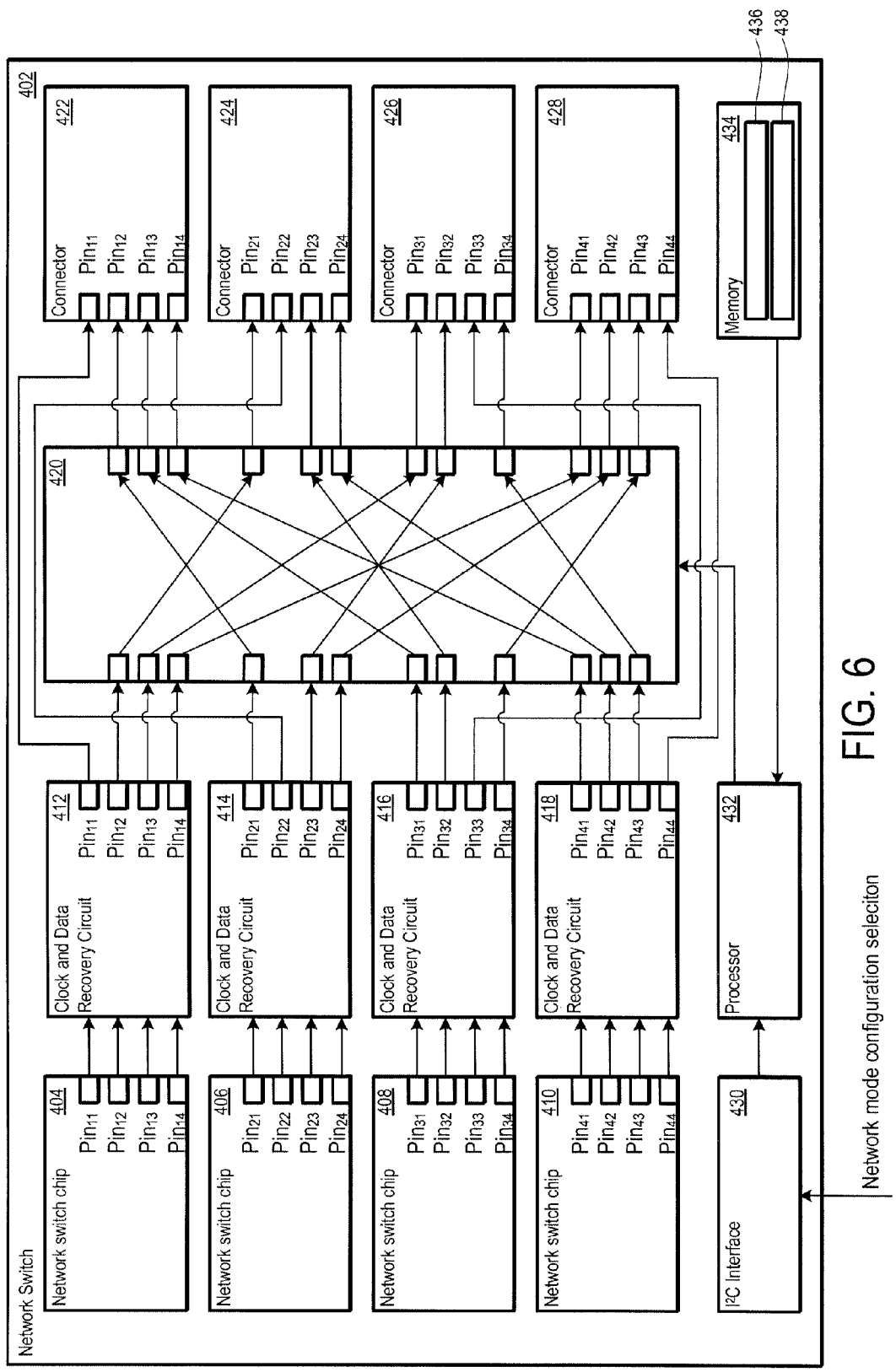
FIG. 6 illustrates the configurable network switch of FIG. 5 operating in a second network operating mode according to aspects of the disclosure.

Moreover, as shown in FIG. 6, the bypassing of the programmable crosspoint chip 420 may not affect whether the network switch 420 is configurable to operate in a one-to-one operating mode (e.g., the 40 GbE network operating mode) or in the one-to-many operating mode (e.g., the 10 GbE network operating mode). FIG. 6 illustrates the data connections of the second network operating mode of the network switch 402. In FIG. 6, each of the network switch chips 404-410 may be connected with a connector 422-428 based on a data connection defined by the second network operating mode configuration 438. Table 4 below shows the data connections that may be defined by the second network operating mode configuration 438.

TABLE 4

Data Connections for Second Network Operating Mode Configuration (FIG. 6)

| Network Switch chip ("NSC") | Data Connection | | Connector | Data connection |
|---|---|---|---|---|
| NSC 404 | $Pin_{12}$ | connected to | Connector 424 | $Pin_{21}$ |
| NSC 404 | $Pin_{13}$ | connected to | Connector 426 | $Pin_{31}$ |
| NSC 404 | $Pin_{14}$ | connected to | Connector 428 | $Pin_{41}$ |
| NSC 406 | $Pin_{21}$ | connected to | Connector 422 | $Pin_{12}$ |
| NSC 406 | $Pin_{23}$ | connected to | Connector 426 | $Pin_{32}$ |
| NSC 406 | $Pin_{24}$ | connected to | Connector 428 | $Pin_{42}$ |
| NSC 408 | $Pin_{31}$ | connected to | Connector 422 | $Pin_{13}$ |
| NSC 408 | $Pin_{32}$ | connected to | Connector 424 | $Pin_{23}$ |
| NSC 408 | $Pin_{34}$ | connected to | Connector 428 | $Pin_{43}$ |
| NSC 410 | $Pin_{41}$ | connected to | Connector 422 | $Pin_{14}$ |
| NSC 410 | $Pin_{42}$ | connected to | Connector 424 | $Pin_{24}$ |
| NSC 410 | $Pin_{43}$ | connected to | Connector 426 | $Pin_{34}$ |

Accordingly, regardless of whether the network switch is configured with bypassed data connections (as in FIG. 5-6) or configured such that the data connections pass through the programmable crosspoint chip 420 (as in FIGS. 3-4), the network switch may configured to operate in either a first network operating mode, which establishes data connections on a one-to-one basis and exhibits an increased transfer speed, or a second network operating mode, which establishes data connections on a one-to-many basis and exhibits a distributed network behavior at the cost of transfer speed.

Figure 7:
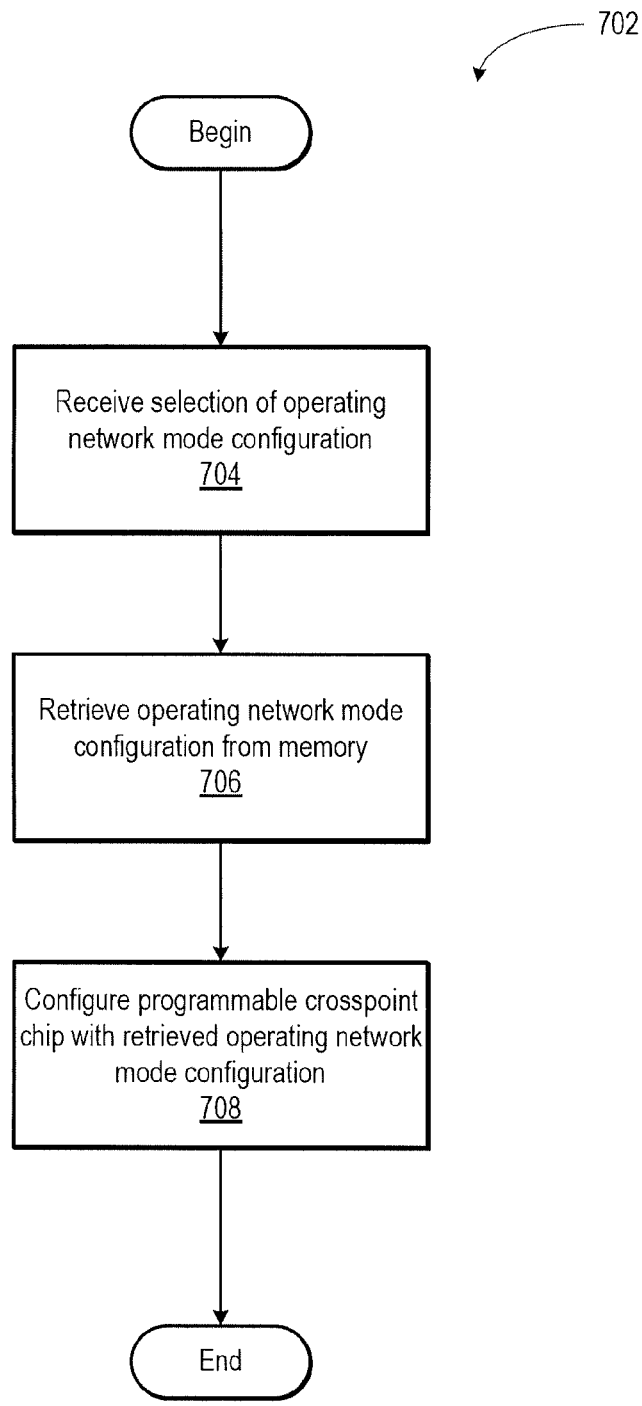
FIG. 7 illustrates one example of logic flow for configuring the configurable network switch according to aspects of the disclosure.

FIG. 7 illustrates an example of logic flow 702 for configuring the configurable network switch 302,402 according to aspects of the disclosure. Initially, the input interface 330,430 may receive a selection of a network operating mode configuration (Block 704). The selection may be for the first network operating mode configuration 336,436 or for the second network operating mode configuration 338,438. The selection may be for another network operating mode configuration, depending on the different network operating mode configurations that may be stored in memory 334,434. The processor 332,432 may then retrieve the selected network operating mode configuration from the memory 434 (Block 706). The processor 332,432 may then configure the programmable crosspoint chip 320,420 to operate in the selected network operating mode. (Block 708). The processor 332,432 may configure the programmable crosspoint chip 320,420, such as by loading the selected network operating mode configuration into the programmable crosspoint chip 320,420.

Accordingly, this disclosure provides for a configurable network switch, where the ports (input or output ports) may transfer at 40 GbE speeds on a one-to-one basis or at 10 GbE speeds on a one-to-many basis. The configurable network switch disclosed herein is particularly advantageous since it allows an operator to continuously use a connected networked device when the network operating mode changes. When the network operating mode is changed, the operator need not disconnect the networked device from the network switch and reconnect the networked device to another port of the network switch. Uninterrupted and continuous use of a networked device is particularly critical in high-profile or enterprise environments. Thus, the disclosed configured network device exhibits a distinct advantage over the previously discussed prior art.

As these and other variations and combinations of the features discussed above can be utilized without departing from the subject matter as defined by the claims, the foregoing description should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. An apparatus having selectable operating network modes, the apparatus comprising:
   a memory operative to store a first operating network mode configuration and a second operating network mode configuration;
   a programmable crosspoint chip operable in one of the first operating network mode configuration or the second operating network mode configuration;
   an input interface operable to receive user input; and
   a processor in communication with the memory and the input interface and operative to:
      receive, from an operator through the input interface, a selection of one of the first operating network mode configuration or the second operating network mode configuration;
      retrieve one of the first operating network mode configuration or the second operating network mode configuration from the memory based on the received selection; and
      configure the programmable crosspoint chip to operate in the first operating network mode configuration or the second operating network mode configuration based on the received selection;
wherein a connection inside the programmable crosspoint chip in the first operating network mode and the second operating network mode is different.

2. The apparatus of claim 1, wherein the selection of the first operating network mode configuration or the second operating mode configuration is a manual selection.

3. The apparatus of claim 1, further comprising:
a plurality of input data channels, wherein each input data channel is operatively connected to an input of the programmable crosspoint chip; and
a plurality of output data channels, wherein each output data channel is operatively connected to an output of the programmable crosspoint chip.

4. The apparatus of claim 3, wherein:
the plurality of input data channels comprises four input data channels, wherein a first input data channel is operatively connected to a first input device, a second input data channel is operatively connected to a second input device, a third input data channel is operatively connected to a third input device, and a fourth input data channel is operatively connected to a fourth input device;
the plurality of output data channels comprises a first output data channel, a second output data channel, a third output data channel, and a fourth output data channel, each output data channel being operatively connected to an output device; and
the first operating network mode configuration is operative to connect the first input data channel with the first output data channel, connect the second input data channel with the second output data channel, connect the third input data channel with the third output data channel, and connect the fourth input data channel with the fourth output data channel.

5. The apparatus of claim 3, wherein:
the plurality of input data channels comprises a first input data channel, a second input data channel, a third input data channel, and a fourth input data channel, each input data channel being operatively connected to an input device;
the plurality of output data channels comprises a first output data channel, a second output data channel, a third output data channel, and a fourth output data channel, each output data channel being operatively connected to an output device; and
the second operating network mode configuration is operative to connect the first input data channel with the first output data channel, connect the second input data channel with the second output data channel, connect the third input data channel with the third output data channel, and connect the fourth input data channel with the fourth output data channel.

6. The apparatus of claim 1, wherein:
the first operating network mode configuration is operative to connect a plurality of input data channels operatively connected to the programmable crosspoint chip with a plurality of output data channels operatively connected to the programmable crosspoint chip;
the second operating network mode configuration is operative to connect the plurality of input data channels with the plurality of output data channels; and
at least one connection between an input data channel and an output data channel is different when the programmable crosspoint chip operates in the first operating network mode configuration than when the programmable crosspoint chip operates in the second operating network mode configuration.

7. The apparatus of claim 1, wherein the first operating network mode is 40 GbE, and the second operating network mode is 10 GbE.

8. The apparatus of claim 1, wherein:
in the first operating network mode, data is transmitted between a first device and a second device using four data channels as a single communication link; and
in the second operating network mode, data is transmitted between the first device and multiple devices, such that each data channel with each of the multiple devices is treated as a single communication link.

9. The apparatus of claim 1, wherein:
in the first operating network mode, data is transmitted between a first device and a second device using four data channels as a single communication link; and
in the second operating network mode, data is transmitted between the first device and the second device using four data channels, each of the data channels treated as a single communication link.

10. A method for selecting an operating mode of a programmable crosspoint switch, the method comprising:
storing, in a computer-readable memory, a first operating network mode configuration and a second operating network mode configuration;
receiving, with an input interface, a selection of one of the first operating network mode configuration or the second operating network mode configuration from an input interface;
retrieving, with a processor in communication with the input interface, one of the first operating network mode configuration or the second operating network mode configuration from the computer-readable memory based on the received selection; and
instructing, with the processor, a programmable crosspoint chip to operate in the first operating network mode configuration or the second operating network mode configuration based on the received selection, wherein a connection inside the programmable crosspoint chip in the first operating network mode and the second operating network mode is different.

11. The method of claim 10, wherein receiving a selection of the first operating network mode configuration or the second operating mode configuration comprises receiving the selection from a user of the programmable crosspoint chip.

12. The method of claim 10, further comprising:
operatively connecting a plurality of input data channels to the programmable crosspoint chip, wherein each input data channel is operatively connected to an input of the programmable crosspoint chip; and
operatively connecting a plurality of output data channels to the programmable crosspoint chip, wherein each output data channel is operatively connected to an output of the programmable crosspoint chip.

13. The method of claim 12, wherein:
the plurality of input data channels comprises four input data channels, wherein a first input data channel is operatively connected to a first input device, a second input data channel is operatively connected to a second input device, a third input data channel is operatively connected to a third input device, and a fourth input data channel is operatively connected to a fourth input device;
the plurality of output data channels comprises a first output data channel, a second output data channel, a third output data channel, and a fourth output data channel, each output data channel being operatively connected to an output device; and the method further comprises:

when the first operating network mode configuration is selected, connecting the first input data channel with the first output data channel, connecting the second input data channel with the second output data channel, connecting the third input data channel with the third output data channel, and connecting the fourth input data channel with the fourth output data channel.

14. The method of claim 12, wherein:

the plurality of input data channels comprises a first input data channel, a second input data channel, a third input data channel, and a fourth input data channel, each input data channel being operatively connected to an input device;

the plurality of output data channels comprises a first output data channel, a second output data channel, a third output data channel, and a fourth output data channel, each output data channel being operatively connected to an output device; and the method further comprises:

when the second operating network mode configuration is selected, connecting the first input data channel with the first output data channel, connecting the second input data channel with the second output data channel, connecting the third input data channel with the third output data channel, and connecting the fourth input data channel with the fourth output data channel.

15. The method of claim 10, further comprising:

when the first operating network mode configuration is selected, connecting a plurality of input data channels operatively connected to the programmable crosspoint chip with a plurality of output data channels operatively connected to the programmable crosspoint chip; and when the second operating network mode configuration is selected, connecting the plurality of input data channels with the plurality of output data channels; wherein:

at least one connection between an input data channel and an output data channel is different when the programmable crosspoint chip operates in the first operating network mode configuration than when the programmable crosspoint chip operates in the second operating network mode configuration.

16. The method of claim 10, wherein the first operating network mode is 40 GbE, and the second operating network mode is 10 GbE.

17. The method of claim 10, wherein:

in the first operating network mode, data is transmitted between a first device and a second device using four data channels as a single communication link; and in the second operating network mode, data is transmitted between the first device and multiple devices, such that each data channel with each of the multiple devices is treated as a single communication link.

18. The method of claim 10, wherein:

in the first operating network mode, data is transmitted between a first device and a second device using four data channels as a single communication link; and in the second operating network mode, data is transmitted between the first device and the second device using four data channels, each of the data channels treated as a single communication link.

\* \* \* \* \*